(12) United States Patent
Hieronymus et al.

(10) Patent No.: US 8,370,742 B2
(45) Date of Patent: Feb. 5, 2013

(54) DISPLAY DEVICE

(75) Inventors: Peter Hieronymus, Scholss Holte-Stukenbrock (DE); Reinhard Laing, Harsewinkel (DE); Jens Roemer, Edertal (DE); Markus Grewinga, Saerbeck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 510 days.

(21) Appl. No.: 12/616,430

(22) Filed: Nov. 11, 2009

(65) Prior Publication Data

US 2010/0125788 A1 May 20, 2010

(30) Foreign Application Priority Data

Nov. 14, 2008 (DE) .................. 10 2008 057 461

(51) Int. Cl.
*G06F 3/01* (2006.01)
(52) U.S. Cl. .................. 715/702; 715/800; 715/772
(58) Field of Classification Search .................. 715/789, 715/834, 825, 811, 812; 345/156
See application file for complete search history.

(56) References Cited

U.S. PATENT DOCUMENTS

| | | | | |
|---|---|---|---|---|
| 5,282,389 A * | 2/1994 | Faivre et al. | ................ | 73/861.73 |
| 5,455,769 A * | 10/1995 | Panoushek et al. | ............. | 701/50 |
| 5,666,793 A * | 9/1997 | Bottinger | ................... | 56/10.2 R |
| 5,926,178 A * | 7/1999 | Kurtenbach | ................. | 715/834 |
| 5,978,720 A * | 11/1999 | Hieronymus et al. | ........ | 701/31.4 |
| 6,282,476 B1 * | 8/2001 | Hieronymus et al. | ........... | 701/50 |
| 6,932,183 B2 * | 8/2005 | Jeppe et al. | .................... | 180/333 |
| 7,266,415 B2 * | 9/2007 | Fitzner | ............. | 700/17 |
| 7,308,326 B2 * | 12/2007 | Maertens et al. | ............... | 700/95 |
| 7,337,023 B2 * | 2/2008 | Diekhans | ........................ | 700/52 |
| 7,362,233 B2 * | 4/2008 | Behnke et al. | ................ | 340/684 |
| 7,415,340 B2 * | 8/2008 | Fitzner | ............ | 701/50 |
| 7,630,809 B2 * | 12/2009 | Behnke et al. | .................. | 701/50 |
| 7,632,179 B2 * | 12/2009 | Brome et al. | ...................... | 460/6 |
| 7,725,233 B2 * | 5/2010 | Hendrickson et al. | .......... | 701/50 |
| 7,771,260 B2 * | 8/2010 | Ricketts et al. | .................... | 460/9 |
| 7,904,485 B2 * | 3/2011 | Bull et al. | ..................... | 707/802 |
| 7,941,765 B2 * | 5/2011 | Fleck et al. | .................... | 715/834 |
| 7,976,369 B2 * | 7/2011 | Craessaerts et al. | ............. | 460/6 |
| 8,108,110 B2 * | 1/2012 | Jeppe et al. | ..................... | 701/50 |
| 2002/0149599 A1 * | 10/2002 | Dwyer et al. | ................. | 345/592 |
| 2003/0037985 A1 * | 2/2003 | Jeppe et al. | .................. | 180/333 |
| 2005/0195096 A1 * | 9/2005 | Ward et al. | ................ | 340/995.14 |
| 2006/0001645 A1 * | 1/2006 | Drucker et al. | ................ | 345/156 |
| 2008/0288144 A1 * | 11/2008 | Jeppe et al. | ..................... | 701/50 |
| 2009/0070363 A1 * | 3/2009 | Bull et al. | ..................... | 707/102 |
| 2009/0187860 A1 * | 7/2009 | Fleck et al. | ................... | 715/834 |

FOREIGN PATENT DOCUMENTS

EP 1 650 715 4/2006

* cited by examiner

*Primary Examiner* — Michael Roswell
*Assistant Examiner* — William Titcomb
(74) *Attorney, Agent, or Firm* — Michael J. Striker (57) ABSTRACT

A display device for displaying operating parameters of an agricultural machine which includes a working unit has a display unit designed such that it may display several subsections, to each of which an operating parameter is assigned, in a first operating state of the working unit, a closed main region having a central geometric focal point may be displayed, and a first subsection is limited on the side by a second subsection, in a second operating state of the working unit, the mean distance between one side of the first subsection and the central geometric focal point is changed, and an agricultural machine includes the working unit, a driver's cab, and the display device.

16 Claims, 8 Drawing Sheets

DISPLAY DEVICE

CROSS-REFERENCE TO A RELATED APPLICATION

The invention described and claimed hereinbelow is also described in German Patent Application DE 10 2008 057 461.9 filed on Nov. 14, 2008. This German Patent Application, whose subject matter is incorporated here by reference, provides the basis for a claim of priority of invention under 35 U.S.C. 119(a)-(d).

BACKGROUND OF THE INVENTION

The present invention relates to a display device with a display unit for displaying operating parameters of an agricultural machine which includes a working unit, and to an agricultural machine which includes a working unit and a driver's cab and has a display device.

Publication EP 1 650 715 B1 discloses a display system which, depending on which menu level is selected, displays a large number of operating parameters, such as ground speed, fuel consumption, crop material throughput, and the height of a header above the ground.

An operator of an agricultural machine is shown a large number of parameters in the display, e.g., ground speed, fuel consumption, crop material throughput, total grain loss, losses from the tray-type shaker, losses due to cleaning, portion of damaged grain, cleanliness level of the harvested grain, height of the header above the ground, and the rotational speed of the various working units. From among the large number of parameters, the driver of the machine must identify the critical parameters and thereby take suitable measures (change the adjustment parameters of the machine—e.g., reduce the ground speed if the grain losses are too high) in order to improve the efficiency of the agricultural working machine.

Due to the large amount of information displayed, the driver must pay very close attention to the display in order to recognize as soon as possible when the machine is no longer operating at an optimal working point. In addition to overloading the driver, another major disadvantage of this is that, under certain circumstances, the driver of the machine may not recognize a critical situation in time or at all.

SUMMARY OF THE INVENTION

The object of the present invention is therefore to provide a display device with a display unit which simplifies the monitoring and control tasks performed by a driver of an agricultural machine.

According to a first exemplary embodiment of the present invention, a display unit of a display device is used to display operating parameters of an agricultural machine which includes a working unit, the display unit being designed such that it may display several subsections, to each of which an operating parameter is assigned; in a first operating state of the working unit, a closed main region having a central geometric focal point may be displayed, and a first subsection is limited on the side by a second subsection; in a second operating state of the working unit, the mean distance between one side of the first subsection and the central geometric focal point is changed.

According to the present invention, the values of the operating parameters are converted, e.g., to geometric figures (e.g., segments of circles), and they are brought into a spatial relationship with one another (the circle segments are combined to form a circular disk). As a result, it is possible to display a large number of operating parameters simultaneously by using simple diagrams (a circular disk). If the values of the operating parameters change, the individual geometric figures may also change. If the operating parameter increases, the corresponding geometric figure may be displayed larger in size, for example. An increase in the operating parameter may also be represented by the geometric figure moving away from the original position (the circle segment moves outwardly). As a result, the driver may be quickly alerted to a change in individual operating parameters from among a large number of operating parameters.

According to a second exemplary embodiment of the present invention, an agricultural machine which includes a working unit and a driver's cab is provided; the agricultural machine includes the display device with the display unit being designed such that it may display several subsections, to each of which an operating parameter is assigned; in a first operating state of the working unit, a closed main region having a central geometric focal point may be displayed, and a first subsection is limited on the side by a second subsection; in a second operating state of the working unit, the mean distance between one side of the first subsection and the central geometric focal point is changeable.

In a further embodiment according to the present invention, a display unit of the display device is provided, in the case of which, in the first operating state, the operating parameter lies below an upper threshold value or above a lower threshold value, and, in the second operating state, the operating parameter lies above an upper threshold value and/or below a lower threshold value. According to the present invention, a primary objective is to visually alert the driver to the fact that individual operating parameters are no longer within their working range, so that the driver may implement countermeasures.

According to a further embodiment of the present invention, a display unit of the display device is provided which includes a boundary which encloses the main region when in the first operating state. According to the present invention, the driver may also be visually alerted to the fact that individual operating parameters have changed by the fact that their corresponding geometric figures move outside of delineated regions. These regions may be enclosed by a boundary.

According to an exemplary embodiment of the present invention, a display unit is provided which is designed such that the number and/or size of the subsections may be moved and/or changed, in particular in a definable order.

According to a further embodiment of the present invention, a display unit is provided which is designed such that the distance between one side of the first subsection and the central geometric focal point corresponds to the change in the operating parameter.

According to a further embodiment of the present invention, a display unit is provided which is designed such that it includes a touchscreen function. As a result, it is possible to call up various layouts within one control menu, thereby making it possible to display different operating parameters, i.e., with different resolution.

According to an exemplary embodiment of the present invention, a display unit is provided which is designed such that, in the first operating state, a shape is displayable which has been selected from a group including a circular disk having subsections shaped like circle segments, a circular disk having subsections shaped like segments of a circular ring, a polygonal shape having subsections shaped like isosceles triangles, and an elliptical shape. The stated embodiment may be further developed, e.g., in that the driver may operate a touchscreen to replace a group member that is displayed initially with a group member that appears to be more appropriate.

In a further embodiment according to the present invention, a display unit is provided which is designed such that the color of the first subsection changes when a threshold value of an operating parameter is exceeded and/or fallen below. According to the present invention, it is possible, e.g., to use color to indicate a necessary sequence in which to consider various operating parameters, or to indicate importance. For example, geometric figures shown in red may indicate that the corresponding operating parameters are in a critical state. In contrast, figures shown in green may indicate that the corresponding operating parameter is in a non-critical state, or that it is situated at an optimum in which maximum efficiency has been attained.

According to a further embodiment of the present invention, the display unit is designed such that the subsection may be moved between a first position and a second position, the first position corresponding to a first limit value of the associated operating parameter, and the second position corresponding to a second limit value of the associated operating parameter.

According to an exemplary embodiment of the present invention, at least one of the two limit values is a dynamic maximum or minimum. A dynamic maximum or a dynamic minimum always results, e.g., when the critical state of an operating parameter changes as the result of another operating parameter having been changed, which is why the permissible working range of the first operating parameter is also variable.

Advantageously, it may also be provided that the first position includes a marking, the marking being designed to be visible to the driver. The markings make it possible, e.g., to visualize permissible working ranges of the corresponding operating parameters.

According to a further embodiment of the present invention, a display unit is provided, and the operating parameters are selected from a group which includes ground speed, fuel consumption, coolant temperature, crop material throughput, total grain loss, loss due to cleaning, loss from tray-type shaker, grain tank volume, portion of damaged grain, cleanliness of crop material, height of header above the ground, rotational speed of the at least one working unit, and distance between two agricultural machines.

According to an exemplary embodiment of the present invention, a display unit is provided which is designed such that the graph of a characteristic curve of an operating parameter may be displayed.

A subject of the present invention may be considered to be to provide a display unit, e.g., for agricultural working machines such as combine harvesters, forage harvesters, etc., the display unit being characterized by an extremely transparent structure in terms of the depiction of various operating parameters of the working machine, thereby ensuring that the driver of the working machine obtains a quick overview of critical operating parameters of the working machine and may easily change them; the display unit itself guides the operator through the setting menus that must be utilized to change the critical parameter.

In particular, a display unit is described which makes it possible to depict operating parameters in a qualitative manner, and with which a uniformity (evenness, homogeneity, or the like) of the main region is lost when an operating parameter deviates from a defined optimum.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
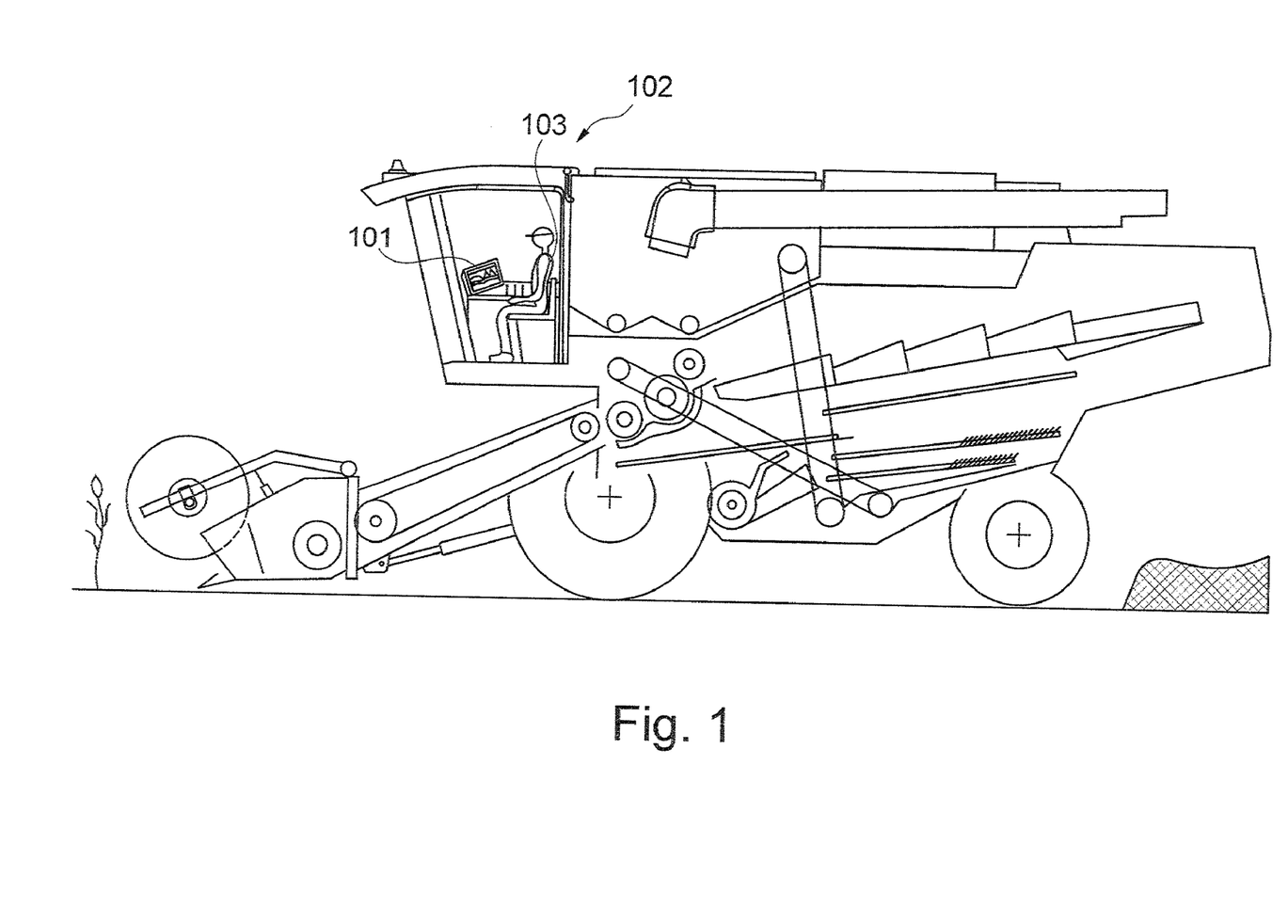
FIG. 1 shows an agricultural machine in accordance with the present invention.

FIG. 1 shows an agricultural working machine designed as a combine harvester, and its various working units. The agricultural machine includes a driver's cab 102, in which driver 103 sits while driving the agricultural machine. A display device 101 which may optically show driver 103 the status of the operating parameters of the agricultural machine is located in the driver's cab. Driver 103 may perform a controlling maneuver of the agricultural machine based on this optical depiction. Display device 101 may include one or more display units according to the present invention.

Figure 2:
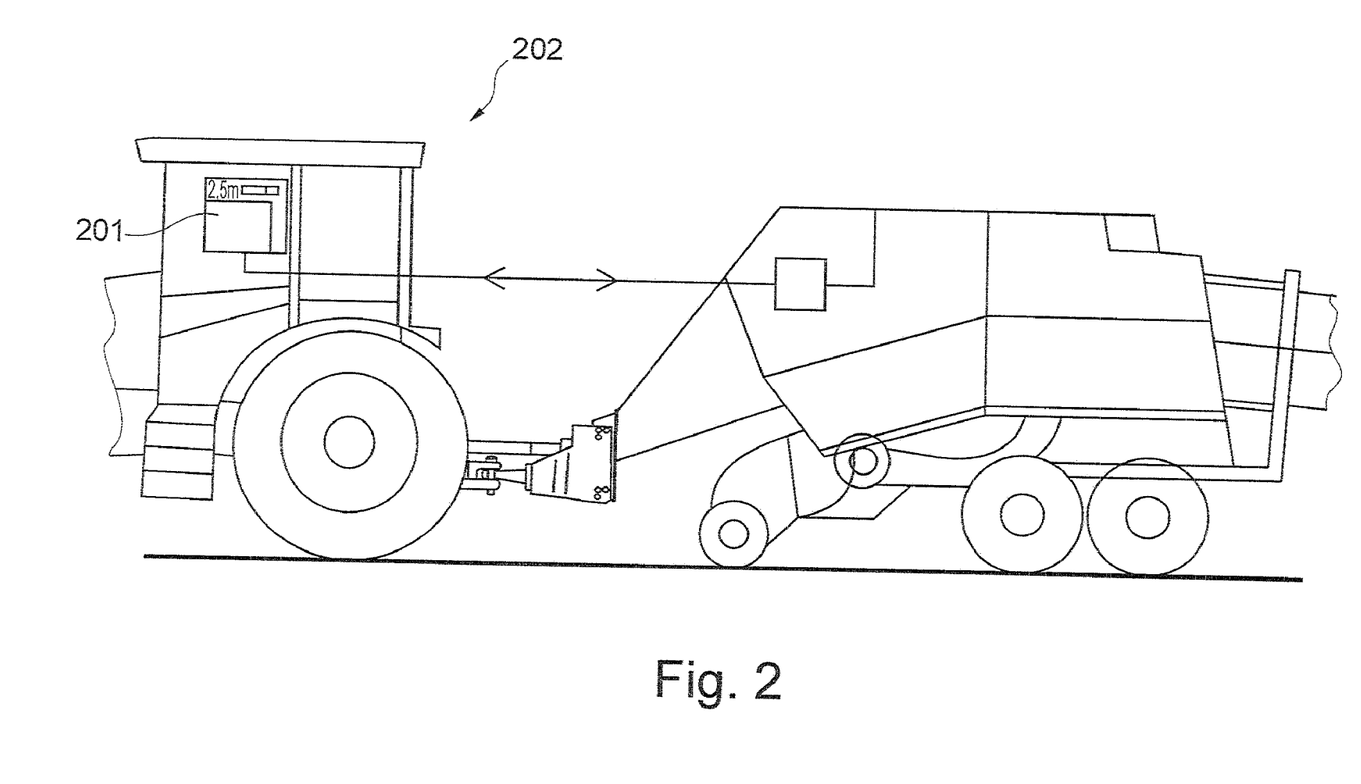
FIG. 2 shows an agricultural machine (tractor) which includes an adapted baler in accordance with the present invention.

FIG. 2 shows a tractor which includes an adapted agricultural baler as an additional working unit. The tractor includes a driver's cab 202; a display device 201 is located in driver's cab 202. A part of the display device may be a display unit according to the present invention.

Figure 3:
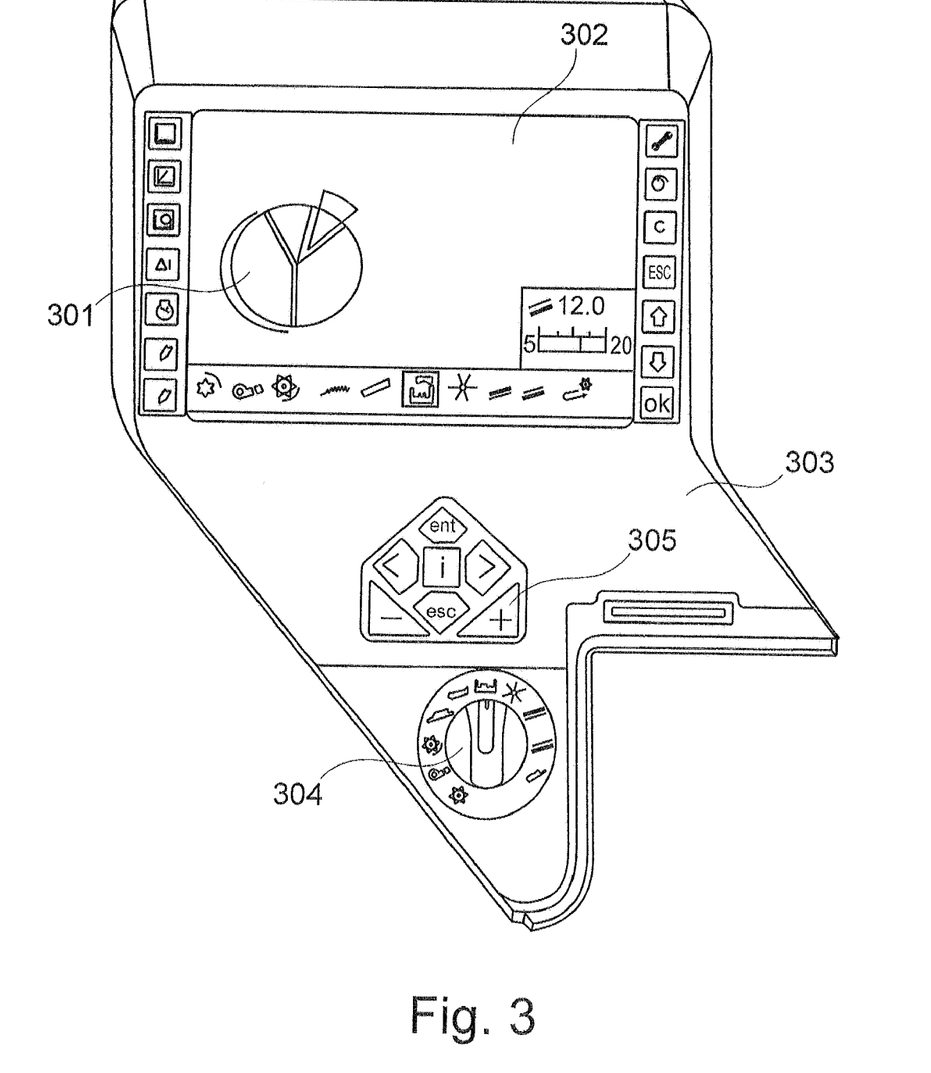
FIG. 3 shows a display device in accordance with the present invention.

FIG. 3 shows a display device which also includes operating elements 304, 305 which are located on a control panel 303. Furthermore, the display device includes a display unit 302 which is suitable for displaying various operating parameters of the agricultural machine. The display unit is suitable for depicting a diagram 301, based on the geometric shape of which the driver of the agricultural machine may identify operating parameters; the diagram is suited, in particular, for providing an overall impression of the operating state of the agricultural machine. This overall impression is created via the conversion of the operating parameters into geometric figures and subsequently placing these geometric figures in relation to one another. The values of the operating parameters may be reflected in the sizes of geometric figures or the lengths of extensions of the figures or their spacial arrangement relative to one another. These geometric figures are then displayed in one another or next to one another, or they are placed in any other type of spacial arrangement relative to one another. A certain overall operating state may be indicated to the driver, e.g., by maintaining or attaining certain geometric figures, e.g., a main region in the form of a circle in this case.

Figure 4:
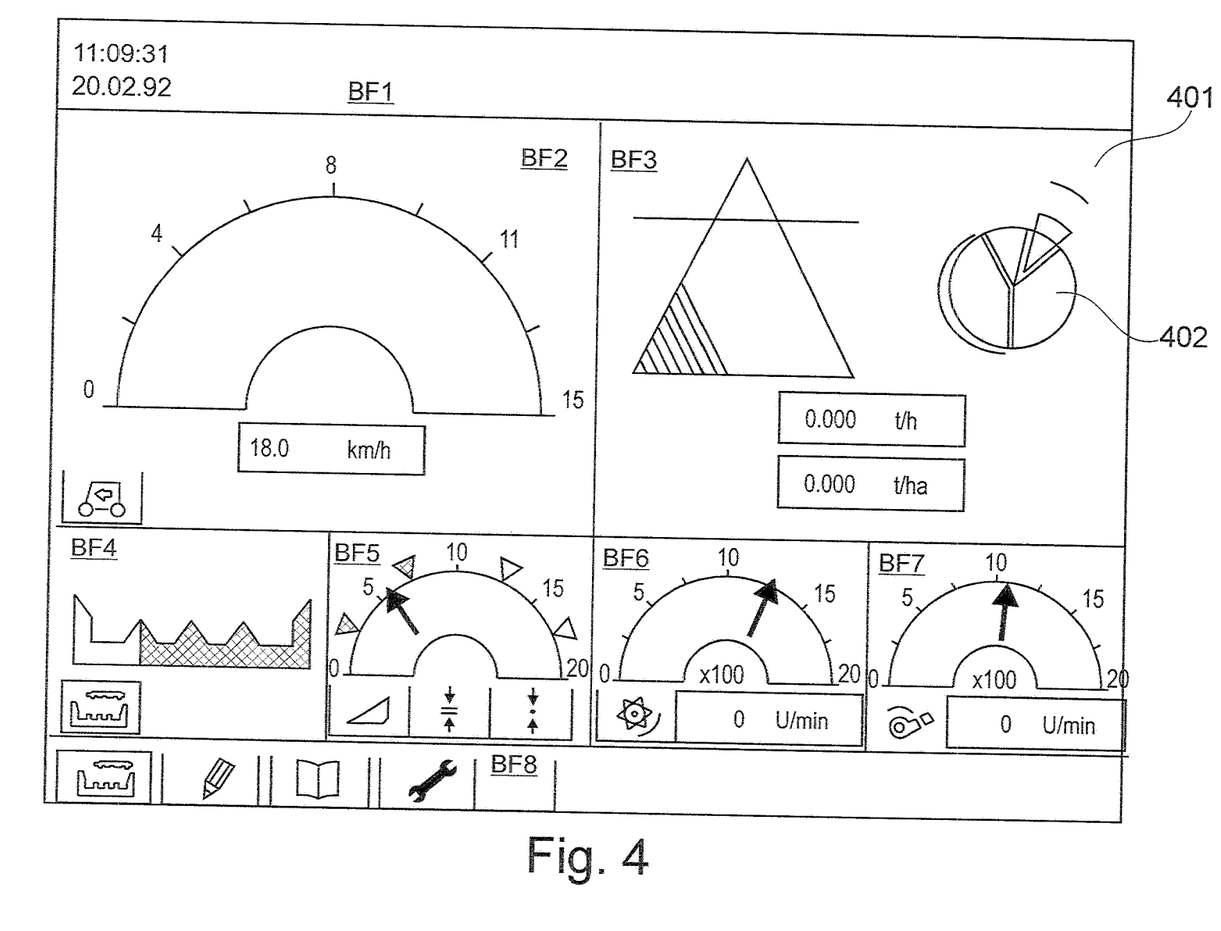
FIG. 4 shows a display device in accordance with the present invention.
Figure 5:
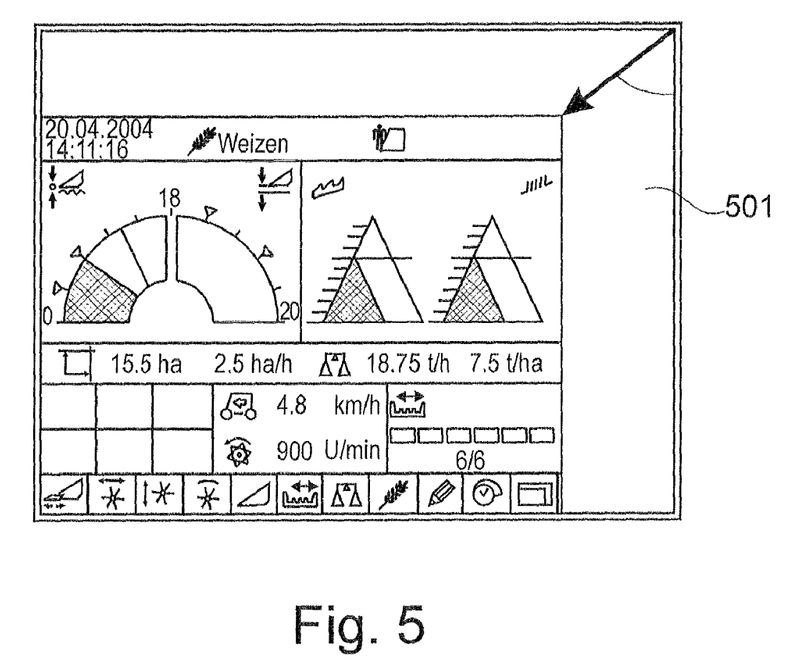
FIG. 5 shows a display device in accordance with the present invention.
Figure 6:
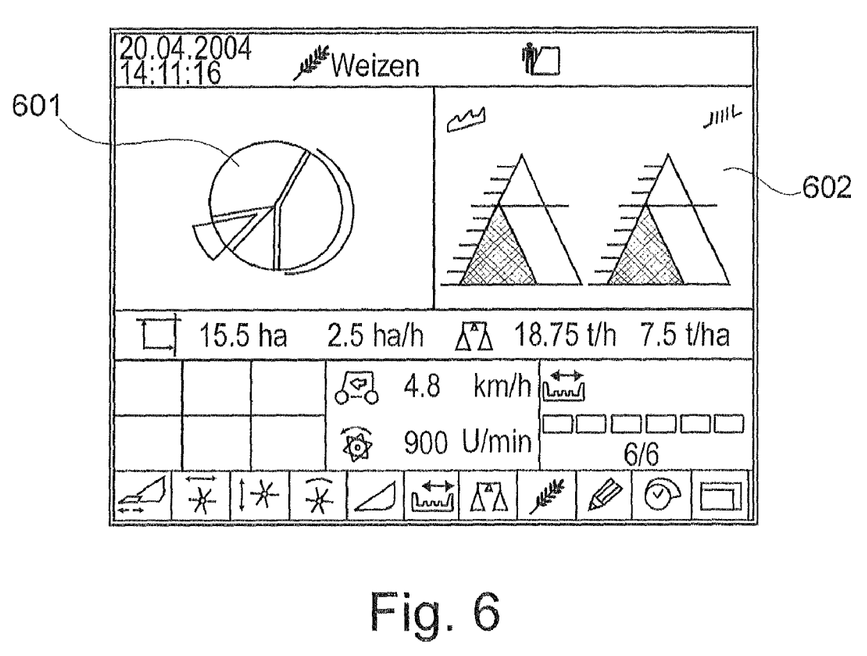
FIG. 6 shows a display device in accordance with the present invention.

FIG. 4 shows a display unit 401 with a diagram 402 for visualizing the operating state or harvesting parameters of an agricultural machine. FIG. 5 shows a display unit 501 without a diagram for visualizing an operating state of an agricultural machine. FIG. 6 shows a display unit 602 with a diagram 601 for visualizing an operating state of an agricultural machine.

Figure 7:
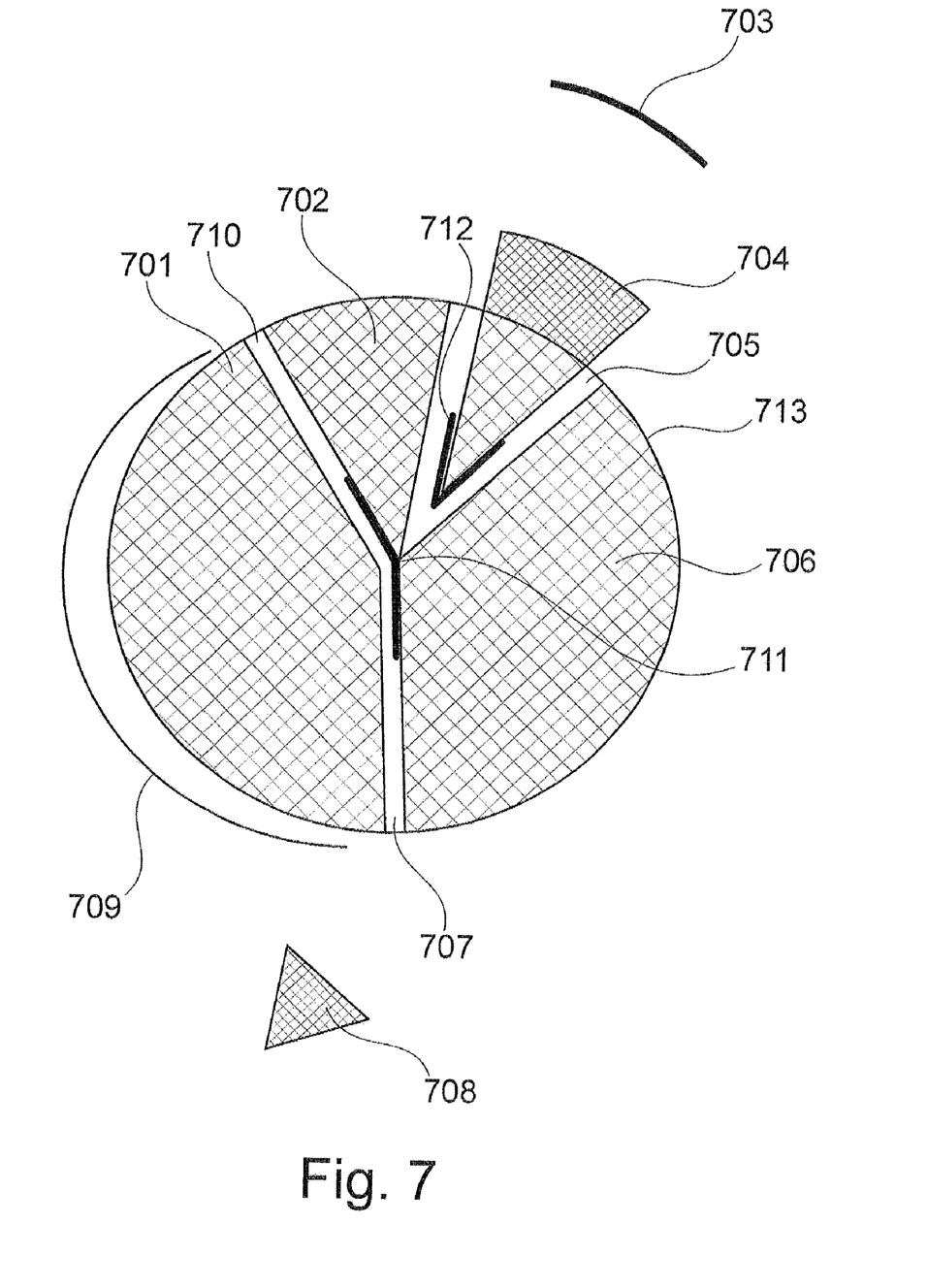
FIG. 7 shows a section of a diagram of a display device in accordance with the present invention.

FIG. 7 shows a diagram which is displayed by a display unit according to the present invention. The diagram is composed of subsections 701, 702, 706 having different sizes and which correspond to the various operating parameters. The size of subsections 701, 702, 706 may represent, e.g., the significance or importance of the particular operating parameters. A subsection having a larger surface area may be assigned, e.g., to an operating parameter that should be given greater significance. However, the variation of the surface areas may also reflect, e.g., a sequence in which handling should be carried out. Lines 710, 705, 707, for example, are located between the individual subsections or regions 701, 702, 706, in order to separate individual subsections 701, 702, 706 in a manner that is clearly visible to the driver.

For example, an operating parameter may be depicted as a circle segment 704. The change in the operating parameter may be reflected as a change in position of circle segment 704. For example, circle segment 704 may move toward or away from a center point 711 of the geometric figure. To depict working ranges, the display unit may also show markings 703, 712, 709. It may be specified, e.g., that, when circle segment 704 moves between marking 712 and marking 703, this is meant to inform the driver that the operating parameter is located in an ordinary working range. When circle segment 704 moves outside of the range bounded by markings 712, 703, this may indicate to the driver that the operating parameter has moved outside of the working range, and the driver must therefore intervene.

A main region may result by joining all circle segments 701, 702, 704, 706 together. In this case (FIG. 7), the main region is a circular disk. Instead of a circular disk, it is also possible to use a filled-in ellipse or any other type of convex or concave closed polygon outline as the main region. The driver may be informed that the agricultural machine is situated in a defined state, e.g., an optimum, if all or most of the subsections (which are circle segments 701, 702, 704, 706 in this case) are located within the main region.

According to the present invention, the display unit may be designed such that individual geometric subsections 701, 702, 706 may change color, at least partially. For example, the color of circle segment 704 could change from green to red if the circle segment moves past marking 703. Furthermore, an arrow 708, which is depicted schematically, may represent, e.g., access to a menu. In this manner, the driver may be able to correct or optimize the operating parameter or harvesting parameter that corresponds to the subsection that moved to the outside (not depicted here). It is understood that a separate menu may be provided for each operating parameter.

The diagram shown in FIG. 7 may be referred to, e.g., as a "magic eye". The magic eye is shaped like a pie, each slice 701, 702, 706 of which represents an operating parameter. When all pie slices are located within boundary 713, all operating parameters are within an optimum range, for instance. In this case, the machine is operating with optimum efficiency. As soon as an operating parameter falls out of a defined optimum (threshold value), particular pie slice 704 moves out of the pie contour, which was originally closed. The driver immediately sees which operating parameter deviates from the optimum, and at which level of intensity.

The display unit according to the present invention may also be designed such that every pie slice 701, 702, 706 may move between two limit values 712, 703, and that it is considered to be optimal, for example, to be within this range. According to the present invention, it is also possible to define the optimal range using software, and for pie slice 704 to start moving once this range is exceeded or fallen below.

A display unit according to the present invention may also include a touchscreen functionality. In this case, a subsection 701, 702, 706 may be touched in order to prompt the display unit to change its display. The new display may be, e.g., a more quantitative or detailed display of the related operating parameter. This would enable the driver to more exactly analyze an individual operating parameter.

A display unit according to the present invention is therefore designed such that it is possible to switch between various display layouts. The other displays could be, e.g., editable characteristic curves of the operating parameters.

Figure 8:
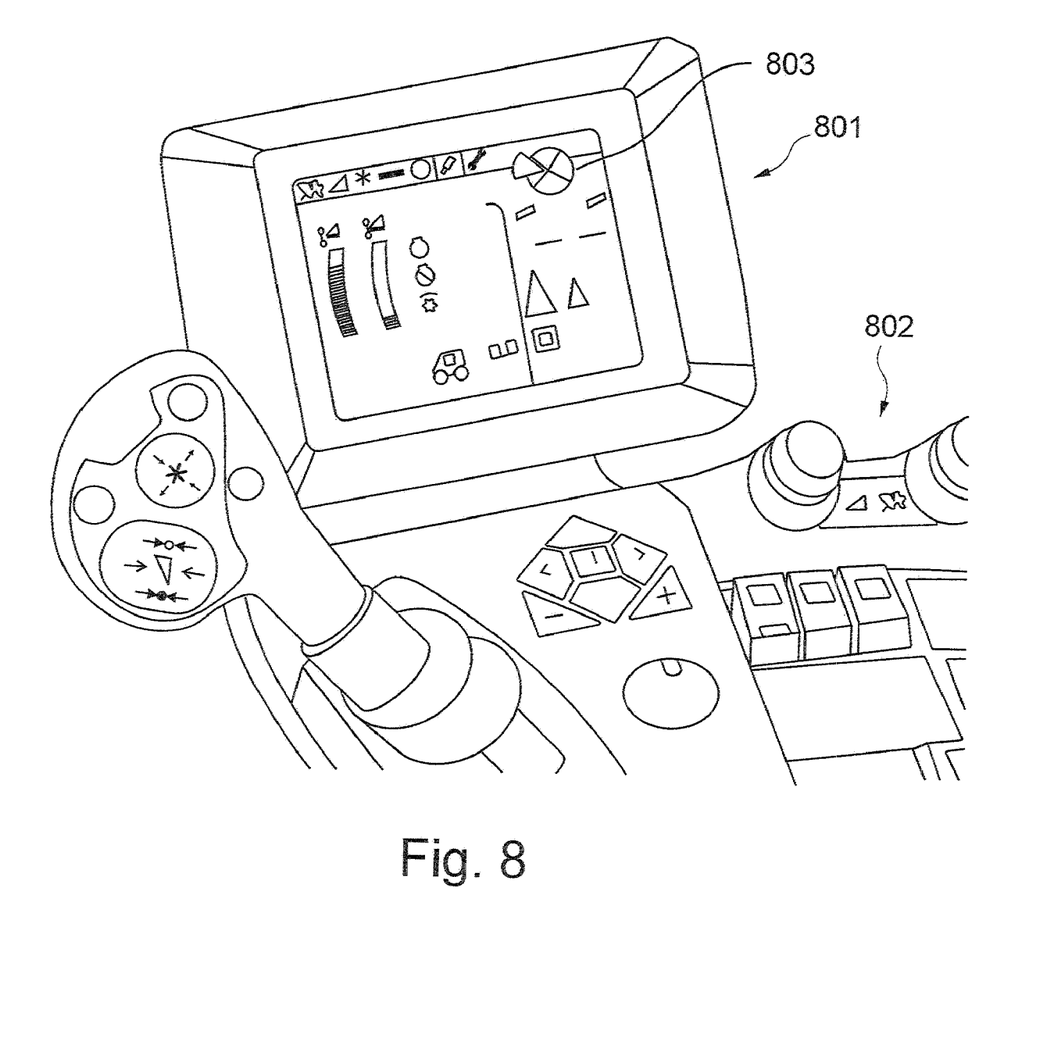
FIG. 8 shows a display device in accordance with the present invention.

FIG. 8 shows the display of display unit 801 according to the present invention after switching is carried out. Previous diagram 803 may be shown reduced in size, for example, so that the driver may continue to observe the other operating parameters, and/or so that the driver knows exactly where he is in the operating menu. Clicking or touching diagram 803 once more may restore the original display, for example.

By touching the pie slice, via the touchscreen, that has moved outside of the pie contour, the driver may prompt a user interface to be displayed that displays shrunken magic eye 803 as well as the adjustable parameters that the driver of the machine may change in order to improve the working result. By changing one or more parameters, the driver may immediately discern via magic eye 803, which is still displayed, whether the change results in an improvement of the non-optimal parameter, and whether the change simultaneously has a negative effect on another parameter (e.g., a higher rotational speed of the cleaning fan results in greater airflow in the cleaning device, thereby increasing the level of cleanliness of the harvested material but also blowing more grains out of the combine harvester, thereby increasing the losses due to cleaning).

Once the optimal setting has been found, magic eye 803 is touched once more to return the display to the "big picture" depiction of magic eye 803.

Figure 9:
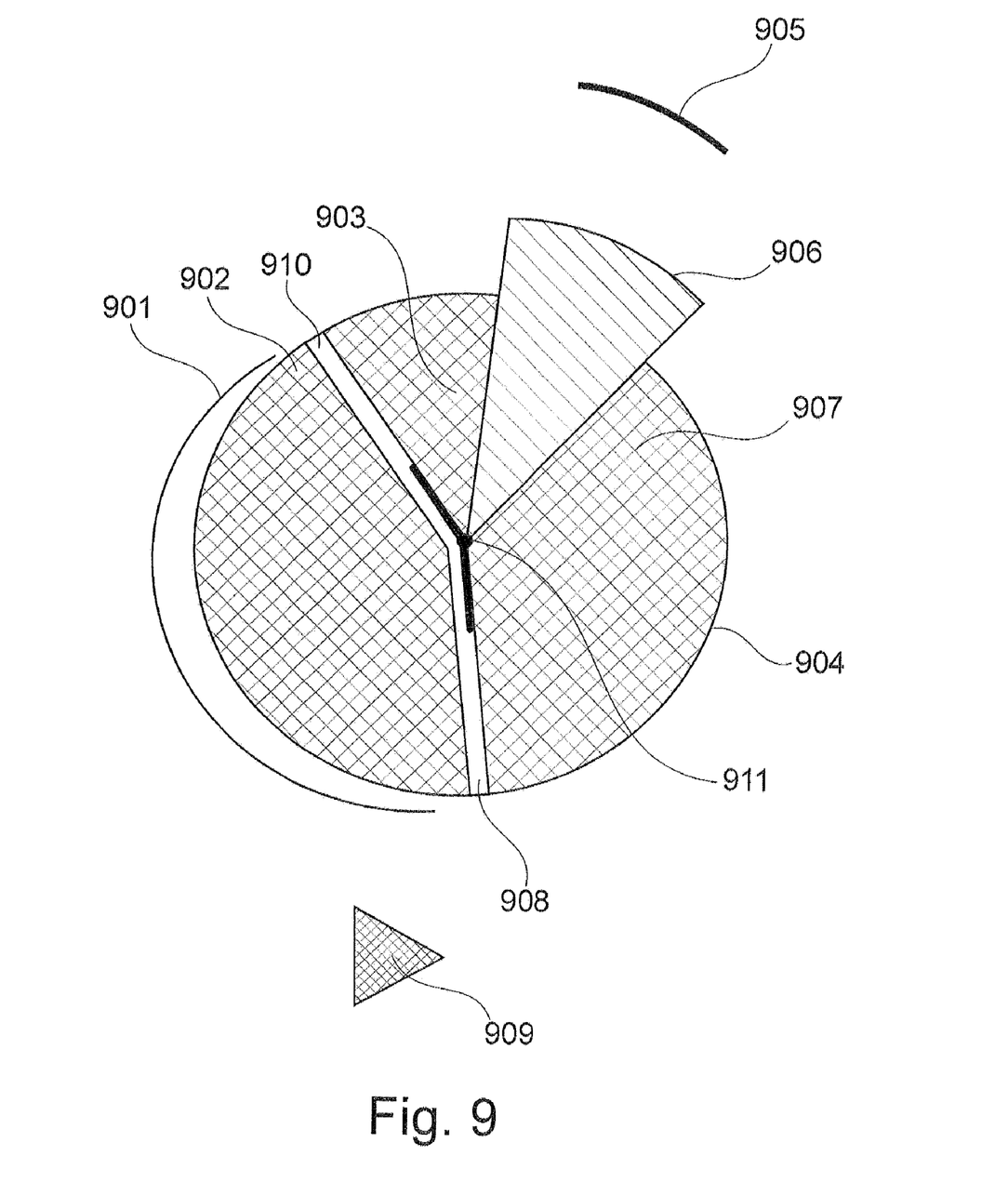
FIG. 9 shows a section of a diagram of a display device in accordance with the present invention.

FIG. 9 shows a magic eye with subsections 902, 903, 907, which are visually separated by lines 910, 908. In addition, a boundary 904 is shown, which encloses subsections 902, 903, 907 in, e.g., a first operating state. Markings 901, 905, which represent the ranges of the operating parameters, are also shown. A schematic arrow 909 is also shown, which may represent, e.g., a direction of travel of the agricultural machine, or which may be used as an aid for use in navigating a menu. Changing an operating parameter may result, e.g., in a circle segment 906 being moved. It is also possible for circle segment 906 to increase in size, e.g., when an operating parameter increases, or for it to shrink when an operating parameter decreases. In this case, it is possible, e.g., for at least one point 911 of circle segment 906 to remain stationary.

It should be noted that the term "include" does not rule out other elements or method steps, and that the term "one" does not rule out several elements and steps.

The reference numerals used serve merely to increase comprehension, and should in no way be considered to be limiting; the scope of protection of the present invention is reflected by the claims.

It will be understood that each of the elements described above, or two or more together, may also find a useful application in other types of constructions differing from the types described above.

While the invention has been illustrated and described as embodied in a display device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An on-board display device for displaying operating parameters of an agricultural machine having a working unit, the display device comprising:
    a display unit configured such that several subsections are displayable, to each of which a specific operating parameter is assigned, so that in a first operating state of the working unit a closed main region having a central geometrical point is displayed and a first subsection, corresponding to a first operating parameter, is limited on a side by a second subsection, corresponding to a second operating parameter, while in a second operating state of the working unit a mean distance between the central geometrical focal point and the first subsection is changed to reflect that the first parameter falls out of a defined optimum or threshold value.

2. A display device as defined in claim 1, wherein said display unit is configured so that in the first operating state the operating parameter lies below an upper threshold value or above a lower threshold value and, in the second operating state the operating parameter lies above an upper threshold value and/or below a lower threshold value.

3. A display device as defined in claim 1, wherein said display unit also has a boundary which encloses the main region in the first operating state.

4. A display device as defined in claim 1, wherein said display unit is configured so that a parameter of the subsections selected from the group consisting of:
    a number of the subsections, a size of the subsections,
    a size of the subsections, or
    both
    has a characteristic selected from the group consisting of:
    being movable, being changeable, or
    both.

5. A display device as defined in claim 4, wherein the number and/or the size of the subsection is movable and/or changeable in a definable order.

6. A display device as defined in claim 1, wherein said display unit is configured so that a distance between one side of the first subsection and the central geometrical focal point corresponds to a change in the operating parameter.

7. A display device as defined in claim 1, wherein said display unit includes a touchscreen function.

8. A display device as defined in claim 1, wherein said display unit is configured so that in the first operating state a shape is displayed that has been selected from the group consisting of:
    a circular disk having subsections shaped like circle segments,
    a circular disk having subsections shaped like segments of a circular ring,
    a polygonal shape having subsections shaped like isosceles triangles, and
    an elliptical shape.

9. A display device as defined in claim 1, wherein said display unit is configured so that a color of the first subsection changes in a condition selected from the group consisting of:
    when a threshold value of the operating parameter is exceeded,
    the threshold value of the operating parameter falls below, or
    both.

10. A display device as defined in claim 1, wherein said display unit is configured so that the subsection is movable between a first position corresponding to a first limit value of an associated operating parameter, and a second position corresponding to a second limit value of the associated operating parameter.

11. A display device as defined in claim 10, wherein at least one of the two limit values is a dynamic maximum or a dynamic minimum.

12. A display device as defined in claim 1, wherein the first subsection includes a marking visible to a driver.

13. A display device as defined in claim 1, wherein said display unit is configured so that the operating parameters are selected from the group consisting of:
    a ground speed,
    a fuel consumption,
    a coolant temperature,
    a crop material throughput,
    a total grain loss,
    a loss due to cleaning,
    a loss from a tray-type shaker,
    a grain tank volume,
    a portion of a damaged grain,
    a cleanliness of a crop material,
    a height of a header above the ground,
    a rotational speed of the at least one working unit, and
    a distance between two agricultural machines.

14. A display device as defined in claim 1, wherein said display unit is configured so that a graph of a characteristic curve of an operating parameter is displayed.

15. An agricultural machine, comprising:
    a working unit; and
    an on-board display device for displaying operating parameters of the agricultural machine, the display device including a display unit configured such that several subsections are displayable, to each of which a specific operating parameter is assigned, so that in a first operating state of the working unit a closed main region having a central geometrical point is displayed and a first subsection corresponding to a first operating parameter, is limited on a side by a second subsection, corresponding to a second operating parameter, while in a second operating state of the working unit a mean distance between the central geometrical focal point and the first subsection is changed to reflect that the first parameter falls out of a defined optimum or threshold value.

16. An agricultural machine as defined in claim 15, further comprising a driver's cab.

* * * * *